United States Patent [19]

Higa

[11] Patent Number: 5,073,257

[45] Date of Patent: Dec. 17, 1991

[54] APPARATUS FOR TREATING WATER

[75] Inventor: Teruo Higa, Ginowan, Japan

[73] Assignees: AKWN Xo., Ltd.; Ryoko Co., Ltd.

[21] Appl. No.: 618,002

[22] Filed: Nov. 23, 1990

Related U.S. Application Data

[60] Continuation of Ser. No. 268,601, Nov. 7, 1988, abandoned, which is a division of Ser. No. 62,351, Jun. 11, 1987, abandoned, which is a continuation-in-part of Ser. No. 863,575, May 15, 1986, abandoned.

[30] Foreign Application Priority Data

Sep. 12, 1985 [JP] Japan .................................. 60-202281

[51] Int. Cl.$^5$ .............................................. C02F 3/32
[52] U.S. Cl. ................................................... 210/170
[58] Field of Search ................. 210/602, 747, 150, 170

[56] References Cited

U.S. PATENT DOCUMENTS 4,678,582 7/1987 Lavigne ............................ 210/602

FOREIGN PATENT DOCUMENTS 3244787 6/1984 Fed. Rep. of Germany ...... 210/602

Primary Examiner—Thomas Wyse

[57] ABSTRACT

A method and apparatus for treating contaminated water without addition of chemical agents. A treatment zone is provided, having water-impermeable bottom and side walls, the bottom sloping stepwise from an input end to an output end. Soil is disposed within the treatment zone, and plants are grown therein. Contaminated water is applied to the input end of the treatment zone and flows through the soil to the output end, thereby being treated by the soil and providing nutrients to the plants. Treated water is collected in a collection area at the bottom of the output end, from where it is removed for use.

10 Claims, 1 Drawing Sheet

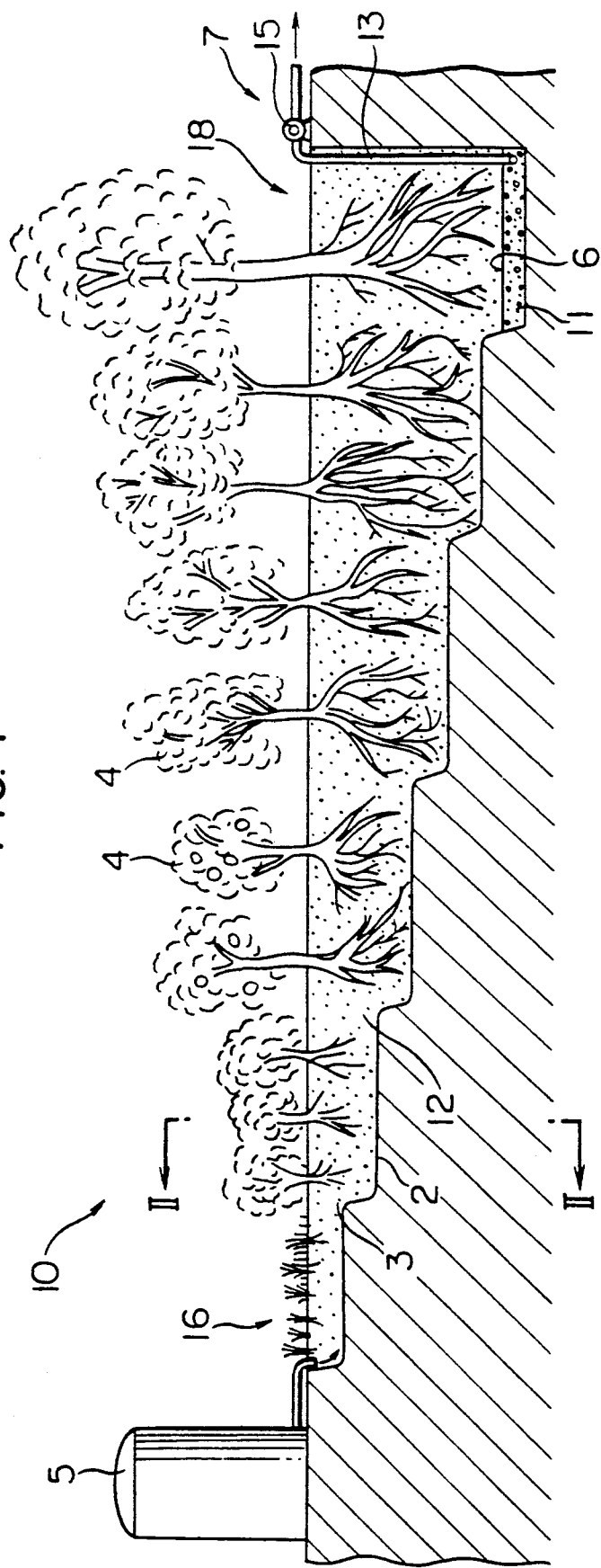

5,073,257

APPARATUS FOR TREATING WATER

This application is a continuation of application Ser. No. 07/268,601, filed No. 7, 1988, now abandoned which is a division of Ser. No. 07/062,351, filed June 11, 1987, now abandoned, which is a CIP of 06/863,575, filed May 15, 1986, now abandoned.

BACKGROUND OF THE INVENTION

The present invention relates to the field of water treatment, and more particularly to the field of water treatment methods and apparatus in which treatment is carried out without the addition of chemical agents.

Treatment of waste water presents an ongoing problem to all communities. Following standard established by local, state, and federal agencies, communities cannot discharge raw waste water into streams, rivers, or the like. Water treatment facilities, however, often require large capital expenditures, imposing severe burdens upon the communities involved. Most purification methods now in service treat waste water in ponds, tanks, or the like, with chemical agents being added to accomplish sterilization or purification. Not only are such methods expensive, but also the water cannot be put to any useful purpose during the period of treatment, and, particularly in arid areas, that requirement poses an additional burden upon the community.

Therefore, a pressing need exists to provide a water treatment method that is relatively inexpensive compared to existing methods and which also allows a community to receive benefit from the water during the treatment process.

SUMMARY OF THE INVENTION

It is an object of the present invention to provide a method for treating water without requiring the addition of chemical agents.

A further object of this invention is a method for treating water that does not require the installation of large facilities.

A further object of this invention is a method for treating water that allows a community to receive benefit from the water during the treatment process.

Yet another object of the present invention is apparatus for treating water that requires little expenditure of capital, yet allows water treatment without the addition of chemical agents.

These and other objects are accomplished by the present invention. The water treatment system disclosed herein includes a treatment zone having waterimpermeable bottom and side partitions. The bottom partitions are arranged in stepwise or slantwise fashion to descend from an input end to an output end, with a collection area, which may be filled with a porous material such as gravel provided at the bottom portion of the output end. The treatment zone is filled with soil, and plants are grown therein, with plant types selected according to the climatic conditions of the particular location and with regard to the depth of the treatment zone at the growing site. For example, the input end could contain plants requiring little root depth, such as grasses, while the output end could contain deep-rooted plants, such as trees.

Waste water is collected in a tank and then applied to the soil at the input end of the treatment zone. Application of additional waste water, coupled with the force of gravity, causes the water to flow from the input end to the output end of the treatment zone, and as it does so, the water interacts with and is treated by the soil. Treated water is collected in the collection area and removed from the treatment zone for reuse. During the treatment process, the plants within the treatment zone make use of the water thus provided, offering the possibility for the community to receive a benefit from the water during the treatment process, in the form of parks, greenbelts, or growing animal feed.

As should be clear, this method does not require the provision of large-scale capital assets. The method is simple, beneficial, and easy to install.

BRIEF DESCRIPTION OF THE DRAWINGS

FIG. 1 is a cross-sectional side view of an embodiment of the present invention;

FIG. 2 is a cross-sectional end-on view of the embodiment shown, taken along the plane II—II of FIG. 1.

DESCRIPTION OF A PREFERRED EMBODIMENT

Am embodiment 10 of the present invention is shown schematically in FIGS. 1 and 2. As seen there, a treatment zone 12 is defined by bottom partitions 2 and side partitions 14. Most conveniently, the treatment zone is formed in a plot of ground by removing a quantity of soil and lining the cavity with a film or sheet, such as polyethylene, polypropylene, or polyvinyl chloride sheeting of about 0.2-1.0 mm. thickness. The side and bottom partitions preferably are formed integrally from single pieces of the film or sheet, but these sections may be formed from separate pieces as desired. Further, the side partitions preferably are relatively vertical, but may be sloped slightly as desired. Of course, the treatment zone can be constructed in any convenient manner known to the art so long as the requirement is followed that the side walls and bottom partitions are waterimpermeable.

The treatment zone is filled with soil 3. The type of soil selected may vary according to the climate of the region in which the apparatus is located, or according to the types of soil available. Those familiar with the art will appreciate that the soil also may be selected with regard to the plants which are to be grown therein, as described hereafter.

The treatment zone 12 has an input end 16 and an output end 18. The bottom 2 of the treatment zone slopes downwardly from the input end to the output end, so that the soil depth is considerably greater at the output end. Preferably, the bottom descends in stepwise fashion, as shown, but it may be convenient to arrange the slope in a slantwise fashion. In the embodiment shown, the descent occurs in six steps, in which each step has a length of about 100–200 meters and height of 50–100 centimeters, so that the total length of the treatment zone is about 600–1200 meters, and the maximum soil depth is in a range from about 3-6 meters. The width of the treatment zone is selected with regard to terrain; a 3-meter width, for example, would be relatively narrow, while a crop field could be rather wide.

A collection area 11 is provided at the bottom of the output end of the treatment zone, filled with any material suitable for collecting and delivering water, such as gravel. If desired, a collection area partition 6, of a non-woven fabric, may be disposed at the top of this area, to prevent intrusion of plant roots and the like. A water delivery system 7, including conventional piping 13 and pump 15, extends into the collection area for removal of treated water.

The plants 4 are planted in the treatment zone soil. The type of plants employed may be selected according to the climate and needs of the area concerned, combined with the depth of the treatment zone at the area planted. For example, areas of the treatment zone disposed toward the input end should contain plants requiring root systems of relatively shallow depth, such as pasture plants, napiergrass, sugar cane or maize, grading toward deep-rooted plants disposed toward the output end of the treatment zone, such as trees. The type of plant selected also will depend upon the needs of the community. For example, if the community decides to employ the treatment zone to provide a greenbelt in an urban area, plants may suitably be selected from shrubs and trees. Requirements for animal feeds or foods for human consumption will dictate other plantings. Those in the art will appreciate that the present invention can be adapted to provide any of these plant types. Similarly, another interactive factor is the soil available. Preferably, the soil should be selected with regard to the contemplated planting, but a limited selection of soil may dictate the plant selection.

Community waste water is collected in a tank 5. This tank may be conveniently located near the treatment zone as shown, or it can be located some distance therefrom and the waste water piped to the treatment zone. At the tank, dust removal or aeration may be provided, as is known in the art. Further, if it is desired to prevent odors, the waste water may be treated with a deodorant such as a microorganism culture, as also known in the art.

Operation of the present invention proceeds with the application of waste water from the tank 5 to the input end 16 of the treatment zone 12, where waste water is confined within the treatment zone by the side partitions 14 and bottoms 2. As additional waste water is added, and at the urging of gravitational forces, the waste water flows within the treatment zone from the input end to the output end. As it proceeds, the soil filters and treats the water, removing contaminants. Furthermore, the waste water contains many organic compounds that can serve as nutrients for the plants 4, further assisting in the removal of contaminants from the water.

In addition, removal of specific contaminants can be assisted by selection of appropriate plants. Those in the art will appreciate that certain plants concentrate certain compounds otherwise considered contaminants. For example, nepiergrass, a pasture plant, exhibits excellent nitrogen absorption, and thus would serve well at the initial stages of the treatment zone. This point is especially important, given the importance of removing nitrogen from the water. Nepiergrass also absorbs phosphorus and potassium compounds, as do sugar cane and corn. If heavy metals are to be removed, pig weeds, such as Japanese dock or spinach, could be planted in the central area of the zone. Toward the end of the zone, plants such as eucalyptus trees would be appropriate, as that plant possesses a deep root structure.

Treated water proceeds through the treatment zone and collects in collection area 11. At appropriate intervals, this water can be removed by the operation of pumping system 7. The appropriate interval will depend upon the amount of water flowing through the system, and the rate at which the water collects in the collection area.

Clearly, the present invention can be adaptable to many forms. For example, the treatment zone can be designed having a relatively narrow width to provide a greenbelt in an urban environment. Alternately, a relatively wide field can be provided, for example by employing appropriate piping mechanisms if the treatment zone is to serve as a pasture or crop area. These and other modifications can be made to the present invention without departing from its scope, which is defined solely by the claims appended hereto.

I claim:

1. Apparatus for treating contaminated water, comprising:

a treatment zone having a bottom and side walls, both being impermeable to water, said bottom sloping downwardly from an input end to an output end;

soil disposed within said treatment zone said soil having plants growing therein;

a collection area located adjacent said bottom toward said output end of said treatment zone;

means for applying contaminated water to said input end; and means for removing said treated water from said collection area.

2. The apparatus of claim 1, wherein said bottom and side walls are integrally formed of sheet material.

3. The apparatus of claim 1 or 2, further including collection area partition means, for preventing the intrusion of plant roots and the like into said collection area.

4. The apparatus of claims 1 or 2, wherein said bottom slopes stepwise.

5. The apparatus of claim 3 wherein said bottom slopes slantwise.

6. Apparatus for treating contaminated water, comprising:

a treatment zone having water-impermeable side and bottom walls, said treatment zone being located beneath the surface of the earth, said bottom walls descending downwardly in a series of steps, form an input end having an input means to an output end having an output means, the top surface of each of said steps being substantially horizontal, said treatment zone containing only soil or other constituents naturally occurring in said zone or artificially added thereto and having plants growing therein which vary from shallowrooted plants positioned near the input end to deep-rooted plants positioned near the output end; whereby the contaminated water may be applied to said soil at said input end through input means so as to allow the water to flow through said soil from said input end to said output end solely by force of gravity and treated water may be collected through output means at the bottom portion of said output end.

7. The apparatus for treating contaminated water of claim 6, wherein said plants being grown nearest said input end of said treatment zone are selected from the group consisting of pasture plants, napiergrass, sugar cane and maize.

8. The apparatus for treating contaminated water of claim 6, wherein said plants being grown in a portion of said treatment zone intermediate between said input end and said output end are selected from the group consisting of pigweed, Japanese dock and spinach.

9. The apparatus for treating contaminated water of claim 6, wherein said plants being grown nearest said output end of said treatment zone are eucalyptus trees.

10. The apparatus for treating contaminated water of claim 6, wherein said plants being frown nearest said input end of said treatment zone are selected from the group consisting of pasture plants, napiergrass, sugar cane and maize, said plants being grown in a portion of said treatment zone intermediate between said input end and said output end are selected from among the group consisting of pigweed, Japanese dock and spinch, and said plants being grown nearest said output end of said treatment zone are eucalyptus trees.

* * * * *

UNITED STATES PATENT AND TRADEMARK OFFICE
CERTIFICATE OF CORRECTION

PATENT NO. : 5,073,257
DATED     : December 17, 1991
INVENTOR(S) : Teruo HIGA

It is certified that error appears in the above-identified patent and that said Letters Patent is hereby corrected as shown below:

Column 1, line 16, change "standard" to --standards--.

Column 2, line 22, change "Aiu embodiment" to --An embodiment--.

Column 4, line 40, change "form" to --from--.

Column 4, line 47, change "shallowrooted" to --shallow-rooted--.

Column 5, line 2, change "frown" to --grown--.

Column 6, line 2, change "spinch" to --spinach--.

Signed and Sealed this

Fifteenth Day of June, 1993

Attest:

MICHAEL K. KIRK

Attesting Officer    Acting Commissioner of Patents and Trademarks